(12) United States Patent
Reddy et al.

(10) Patent No.: US 10,081,756 B1
(45) Date of Patent: Sep. 25, 2018

(54) LOSS CIRCULATION MATERIAL COMPOSITION COMPRISING OIL-SWELLABLE AND DESOLVATED POLYMER GELS

(71) Applicant: Saudi Arabian Oil Company, Dhahran (SA)

(72) Inventors: B. Raghava Reddy, Pearland, TX (US); Matthew Hilfiger, Richmond, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/829,532

(22) Filed: Dec. 1, 2017

Related U.S. Application Data

(60) Provisional application No. 62/507,544, filed on May 17, 2017.

(51) Int. Cl.
| | |
|---|---|
| E21B 21/00 | (2006.01) |
| C09K 8/502 | (2006.01) |
| C09K 8/42 | (2006.01) |
| C04B 24/26 | (2006.01) |
| C08F 8/32 | (2006.01) |
| E21B 33/138 | (2006.01) |
| E21B 33/14 | (2006.01) |
| C08J 3/09 | (2006.01) |

(52) U.S. Cl.
CPC .......... *C09K 8/502* (2013.01); *C04B 24/2688* (2013.01); *C08F 8/32* (2013.01); *C08J 3/092* (2013.01); *C09K 8/42* (2013.01); *E21B 21/003* (2013.01); *E21B 33/138* (2013.01); *E21B 33/14* (2013.01); *C08J 2323/36* (2013.01)

(58) Field of Classification Search
CPC ...... C09K 8/502; C08F 24/2688; C08F 3/092; E21B 21/003; E21B 33/14; C08L 2323/36
USPC ........................................................ 166/293
See application file for complete search history.

(56) References Cited

U.S. PATENT DOCUMENTS 3,336,979 A   8/1967   Ingraham et al.
3,353,601 A   11/1967  Dollarhide et al.
(Continued)

FOREIGN PATENT DOCUMENTS

EP   2942374 A1   11/2015
GB   718168 A     11/1954

OTHER PUBLICATIONS

International Search Report and Written Opinion for International Application No. PCT/US2018/033162; International Filing Date May 17, 2018; Report dated Jul. 5, 2018 (pp. 1-14).

*Primary Examiner* — Silvana C Runyan
(74) *Attorney, Agent, or Firm* — Bracewell LLP; Constance G. Rhebergen; Brian H. Tompkins

(57) ABSTRACT

An oil-swellable gel lost circulation material (LCM) formed from an elastomeric polymer and a crosslinker amine is provided. The LCM may include gel pieces cut from gel strands formed from an elastomeric polymer and a crosslinker amine. The oil-swellable gel LCM composition may be formed by mixing an elastomeric polymer solution with a crosslinker amine and heating the mixture to form a crosslinked gel. The gel may be extruded through a die having orifices into a non-solvent and allowed to desolvate in the presence of the non-solvent. The gel strands may be dried and cut into gel pieces to form an LCM. The resulting LCM may swell when introduced to a loss circulation zone
(Continued)

in the presence of a non-aqueous fluid such as a drilling mud or component of a drilling mud.

20 Claims, 1 Drawing Sheet

(56) References Cited

U.S. PATENT DOCUMENTS

| | | | |
|---|---|---|---|
| 4,172,066 A | 10/1979 | Zweigle et al. |
| 4,529,656 A | 7/1985 | Haigh et al. |
| 4,704,213 A | 11/1987 | Delhommer et al. |
| 4,772,635 A | 9/1988 | Mitschker et al. |
| 5,161,615 A | 11/1992 | Hutchins et al. |
| 5,362,787 A | 11/1994 | Ngoc et al. |
| 5,465,792 A | 11/1995 | Dawson et al. |
| 6,518,224 B2 | 2/2003 | Wood |
| 7,267,174 B2 | 9/2007 | Gonsveld et al. |
| 7,341,106 B2 | 3/2008 | Reddy et al. |
| 7,395,863 B2 | 7/2008 | Wang et al. |
| 7,510,004 B1 | 3/2009 | Hessert et al. |
| 7,530,396 B1 | 5/2009 | Reddy et al. |
| 7,748,452 B2 | 7/2010 | Sullivan et al. |
| 7,776,797 B2 | 8/2010 | Allin et al. |
| 7,888,296 B2 | 2/2011 | Morris et al. |
| 7,923,413 B2 | 4/2011 | Ghassemzadeh |
| 7,928,042 B2 | 4/2011 | Reed et al. |
| 7,947,630 B2 | 5/2011 | Atkins et al. |
| 8,132,623 B2 | 3/2012 | Allin et al. |
| 9,139,762 B2 | 9/2015 | Moradi-Araghi et al. |
| 9,206,346 B2 | 12/2015 | Kurian et al. |
| 9,260,650 B2 | 2/2016 | Nguyen |
| 9,267,075 B2 | 2/2016 | Moradi-Araghi et al. |
| 2002/0010100 A1 | 1/2002 | Wood |
| 2003/0194504 A1 | 10/2003 | Bilyk et al. |
| 2005/0080176 A1 | 4/2005 | Robb |
| 2007/0068816 A1 | 3/2007 | Solomon et al. |
| 2007/0204989 A1 | 9/2007 | Tang |
| 2009/0258963 A1 | 10/2009 | Moore |
| 2012/0059103 A1 | 3/2012 | Lux et al. |
| 2013/0184409 A1 | 7/2013 | Fujisawa et al. |
| 2014/0349894 A1 | 11/2014 | Quintero et al. |
| 2015/0211330 A1 | 7/2015 | Daou et al. |
| 2017/0174977 A1 | 6/2017 | Bulte-Loyer et al. |

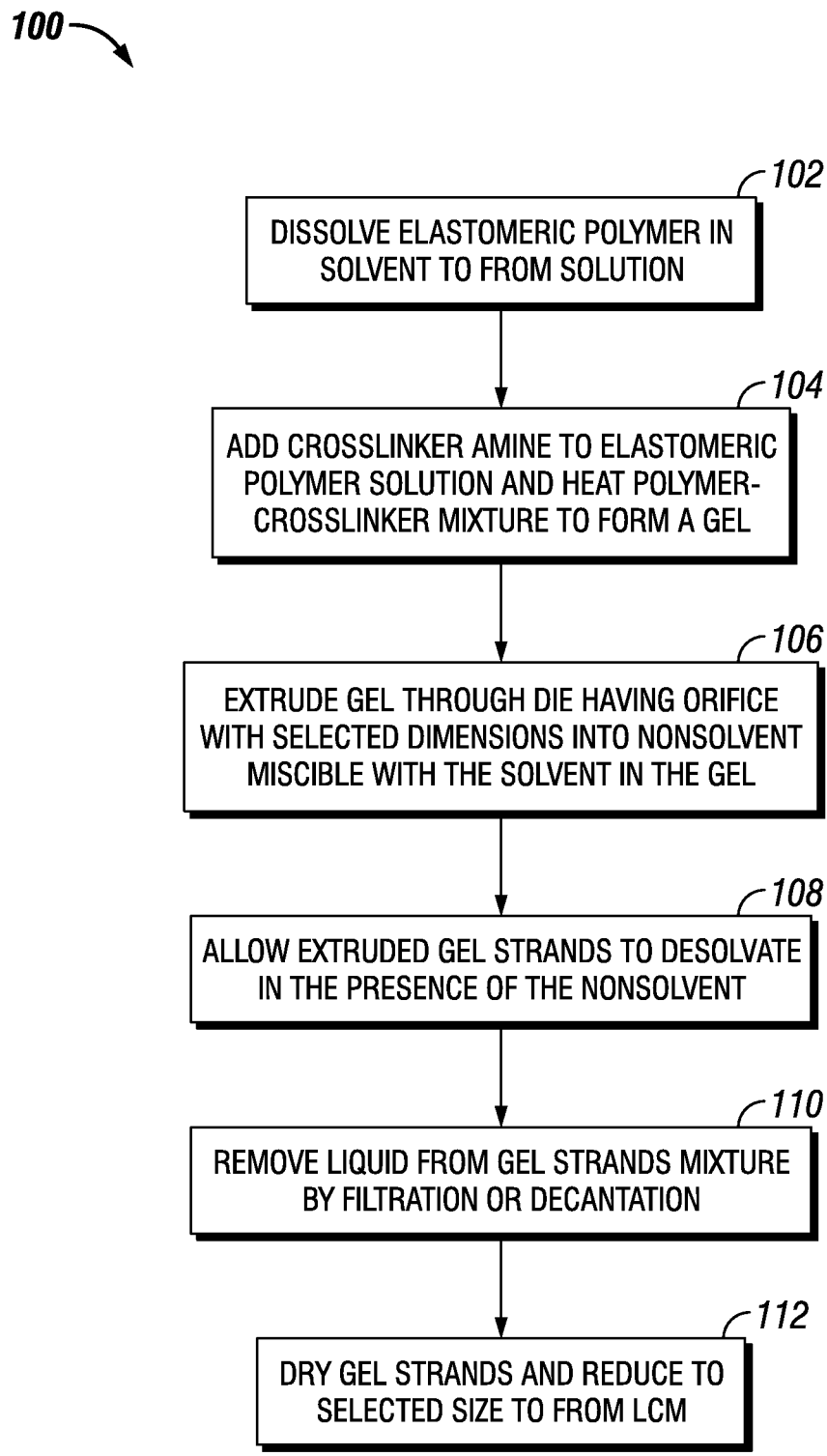

LOSS CIRCULATION MATERIAL COMPOSITION COMPRISING OIL-SWELLABLE AND DESOLVATED POLYMER GELS

CROSS-REFERENCE TO RELATED APPLICATIONS

This application claims priority from U.S. Provisional Application No. 62/507,544 filed May 17, 2017, and titled "OIL-SWELLABLE, DESOLVATED POLYMER GELS AND METHODS OF USING THE SAME FOR PREVENTING LOSS OF NON-AQUEOUS WELLBORE FLUIDS TO THE SUBTERRANEAN FORMATION." For purposes of United States patent practice, this application incorporates the contents of the Provisional Application by reference in its entirety.

BACKGROUND

Field of the Disclosure

Embodiments of the disclosure generally relate to controlling lost circulation in a well and, more specifically, to lost circulation materials (LCMs).

Description of the Related Art

Various challenges are encountered during drilling and production operations of oil and gas wells. For example, fluids used in drilling, completion, or servicing of a wellbore, such as non-aqueous fluids like synthetic-based muds (SBM) and oil-based muds (OBM), can be lost to the subterranean formation while circulating the fluids in the wellbore. Such lost circulation can be encountered during any stage of operations and occurs when drilling fluid (or drilling mud) pumped into a well returns partially or does not return to the surface. While de minimis fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. Lost circulation problems may also contribute to non-productive time (NPT) for a drilling operation. The severity of the lost circulation depends on the amount of fluid lost and the dimension of the lost circulation zone.

SUMMARY

Lost circulation materials (LCMs) are used to mitigate lost circulation by blocking the path of the drilling mud into the formation. The type of LCM used in a lost circulation situation depends on the extent of lost circulation and the type of formation. While relatively low circulation losses of drilling fluids can be treated with conventional pills having lost circulation materials such as fibers or graded particles, heavy losses cannot be similarly treated because of the large dimensions of lost circulation zones.

Embodiments of the disclosure generally relate to a lost circulation material that can swell but not dissolve when placed in contact with a non-aqueous fluid such as a synthetic-based mud (SBM) or oil-based mud (OBM). In one embodiment, a method of forming a lost circulation material (LCM) is provided. The method includes preparing an elastomeric polymer solution of an elastomeric polymer and a solvent and mixing the elastomeric polymer solution with a crosslinker to form a gel, the elastomeric polymer including a first monomer comprising an olefinically unsaturated hydrocarbon monomer and a second monomer comprising an epoxy pendant group. The crosslinker includes an amine. The method further includes extruding the gel through an orifice having a diameter and into a non-solvent to form a gel strand, the non-solvent miscible with the solvent, and cutting the desolvated gel strand into a plurality of particulate gel pieces to form the LCM. In some embodiments, the method includes removing the non-solvent and remaining solvent from the gel strand. In some embodiments, removing the non-solvent and remaining solvent from the gel strand includes filtering the non-solvent and remaining solvent from the gel strand and decanting the non-solvent and remaining solvent from the gel strand.

In some embodiments, the second monomer is a glycidyl acrylate. In some embodiments, the elastomeric polymer is ethylene/methyl acrylate/glycidyl methacrylate terpolymer. In some embodiments, the amine includes a polyamine having at least two primary amine groups. In some embodiments, the amine includes at least one of: tetraethylene pentaamine (TEPA), triethylene glycol diamine (TEGDA), polyoxypropylene triamine (POPTA), and diethyltoluenediamine (DETDA). In some embodiments, the solvent is xylene. In some embodiments, the non-solvent is acetone. In some embodiments, the diameter is in the range of 1 millimeter (mm) to 5 mm. In some embodiments, the cure accelerator includes an alkanolamine. In some embodiments, the method includes mixing a cure accelerator with the elastomeric polymer solution and crosslinker. In some embodiments, the method includes air drying the gel strand before cutting the gel strand into a plurality of gel pieces to form the LCM.

In another embodiment, a method to control lost circulation in a well is provided. The method includes introducing a lost circulation material (LCM) into the wellbore such that the LCM contacts the lost circulation zone and reduces a rate of lost circulation into the lost circulation zone as compared to a period before introducing the LCM. The LCM includes a plurality of desolvated particulate gel pieces of an elastomeric polymer crosslinked using a crosslinker. The crosslinker includes an amine. The elastomeric polymer includes a first monomer comprising an olefinically unsaturated hydrocarbon monomer and a second monomer comprising an epoxy pendant group. Introducing the LCM into the wellbore includes mixing the LCM with a non-swellable non-aqueous solvent such that the LCM is in an unswollen form, pumping the non-swellable non-aqueous solvent and LCM into the lost circulation zone, and displacing the non-swellable non-aqueous solvent with a swelling non-aqueous fluid, such that the plurality of desolvated particulate gel pieces swell within the loss circulation zone. In some embodiments, the non-swellable solvent is an alcohol, a ketone, or an alcohol ether. In some embodiments, the elastomeric polymer includes a first monomer that includes an olefinically unsaturated hydrocarbon monomer and a second monomer that includes an epoxy pendant group. In some embodiments, the second monomer includes a glycidyl acrylate. In some embodiments, the elastomeric polymer is ethylene/methyl acrylate/glycidyl methacrylate terpolymer. In some embodiments, the amine includes a polyamine having at least two primary amine groups. In some embodiments, the amine includes at least one of: tetraethylene pentaamine (TEPA), triethylene glycol diamine (TEGDA), polyoxypropylene triamine (POPTA), and diethyltoluenediamine (DETDA). In some embodiments, the diameter is in the range of 1 mm to 5 mm. In some embodiments, the length of each of the plurality of gel pieces is in the range of 2 mm to 15 mm. In some embodiments, the non-aqueous fluid is a synthetic-based mud (SBM) or an oil-based mud (OBM). In some embodiments, the swelling non-aqueous fluid comprises a non-aqueous solvent comprising an aromatic hydrocarbon or an aliphatic hydrocarbon.

In some embodiments, a lost circulation material (LCM) composition is provided. The LCM includes a plurality of gel pieces of an elastomeric polymer crosslinked using a crosslinker. The crosslinker consists of an amine. The elastomeric polymer includes a first monomer comprising an olefinically unsaturated hydrocarbon monomer and a second monomer comprising an epoxy pendant group. The plurality of gel pieces are formed by extruding a gel through an orifice having a diameter and into a non-solvent to form a gel strand and cutting the gel strand into the plurality of gel pieces to form the LCM. In some embodiments, the second monomer includes a glycidyl acrylate. In some embodiments, the elastomeric polymer is ethylene/methyl acrylate/glycidyl methacrylate terpolymer. In some embodiments, the amine is a polyamine having at least two primary amine groups. In some embodiments, the amine includes at least one of: tetraethylene pentaamine (TEPA), triethylene glycol diamine (TEGDA), polyoxypropylene triamine (POPTA), and diethyltoluenediamine (DETDA). In some embodiments, the diameter of each of the plurality of gel pieces is in the range of 1 millimeter (mm) to 5 mm. In some embodiments, the length of each of the plurality of gel pieces is in the range of 2 millimeter (mm) to 15 mm.

In some embodiments, a method of cementing a well is provided. The method includes mixing an additive with a cement formulation to form an altered cement formulation. The additive includes a plurality of gel pieces of an elastomeric polymer crosslinked using a crosslinker that includes an amine. The elastomeric polymer includes a first monomer comprising an olefinically unsaturated hydrocarbon monomer and a second monomer comprising an epoxy pendant group. The method also includes introducing the altered cement formulation into an annular space in a wellbore, such that cement forms a sealant in the annular space. In some embodiments, the second monomer includes a glycidyl acrylate. In some embodiments, the elastomeric polymer includes ethylene/methyl acrylate/glycidyl methacrylate terpolymer. In some embodiments, the amine is a polyamine having at least two primary amine groups. In some embodiments, the amine includes at least one of tetraethylene pentaamine (TEPA), triethylene glycol diamine (TEGDA), polyoxypropylene triamine (POPTA), and diethyltoluenediamine (DETDA). In some embodiments, the diameter of each of the plurality of gel pieces is in the range of 1 millimeter (mm) to 5 mm. In some embodiments, the length of each of the plurality of gel pieces is in the range of 2 millimeter (mm) to 15 mm. In some

BRIEF DESCRIPTION OF THE DRAWINGS

The FIGURE is a block diagram of a process for forming a gel LCM from an elastomeric polymer and crosslinker amine in accordance with embodiments of the disclosure.

DETAILED DESCRIPTION

The present disclosure will now be described more fully hereinafter with reference to the accompanying drawings, which illustrate embodiments of the disclosure. This disclosure may, however, be embodied in many different forms and should not be construed as limited to the illustrated embodiments set forth herein. Rather, these embodiments are provided so that this disclosure will be thorough and complete, and will fully convey the scope of the disclosure to those skilled in the art.

Embodiments of the disclosure include a lost circulation material (LCM) having an oil-swellable desolvated polymer gel. The gel LCM may include gel pieces cut from gel strands formed from an elastomeric polymer and a crosslinker amine. In some embodiments, the elastomeric polymer includes a monomer with an epoxy pendant group. In some embodiments, the crosslinker amine has at least two primary amine groups. In some embodiments, the LCM is formed from an elastomeric polymer, a crosslinker amine, and a cure accelerator. In some embodiments, the LCM gel pieces have a length in the range of 2 mm to 15 mm and a diameter in the range of 1 mm to 5 mm.

In some embodiments, the elastomeric polymer is a copolymer having an olefinically unsaturated hydrocarbon monomer and a monomer having an epoxy pendant group. In some embodiments, the monomer having an epoxy pendant group may be a glycidyl acrylate monomer (for example, glycidyl methacrylate). In some embodiments, the molar ratio of unsaturated hydrocarbon monomer to epoxy containing monomer is in the range of about 75:25 to about 99:1. In some embodiments the elastomeric polymer includes an additional polar monomer. In some embodiments, the molar ratio of the sum of olefinically unsaturated hydrocarbon monomer and the polar monomer to epoxy containing monomer is in the range of about 75:25 to about 99:1. Examples of suitable polar monomers include olefinically unsaturated esters. In some embodiments, suitable olefinically unsaturated esters include methyl acrylate, methyl methacryalate, ethyl acrylate, ethyl methacrylate, butyl acrylate, and butyl methacrylate. In some embodiments, the elastomeric polymer may be ethylene/methyl acrylate/glycidyl methacrylate terpolymer. In some embodiments, the elastomeric polymer may be Lotader® AX8840 or Lotader® AX8900 available from Arkema Inc., of King of Prussia, Philadelphia, USA.

In some embodiments, the crosslinker amine is tetraethylene pentaamine (TEPA), triethylene glycol diamine (TEGDA), polyoxypropylene triamine (POPTA), or diethyltoluenediamine (DETDA). In other embodiments, the crosslinker amines may include the crosslinker amines described in U.S. Publication No. 2017/0073555 titled "Pendant Epoxide Polymers and Methods of Treating Subterranean Formations," a copy of which is hereby incorporated by reference for the purposes of United States patent practice. In some embodiments, the weight ratio of elastomeric polymer to amine crosslinker is 10:1 to 4:1.

In some embodiments, the cure accelerator is an accelerator having both hydroxyl groups and reactive amine groups. In some embodiments, the cure accelerator is an alkanolamine. For example, suitable alkanolamines may include diethanolamine, triethanolamine, or combinations thereof. In some embodiments, the cure accelerator may be Accelerator 399 available from Huntsman Corporation of The Woodlands, Tex., USA. In some embodiments, the ratio of crosslinker amine to cure accelerator is in the range of 100:1 to 5:1

The oil-swellable gel LCM composition may be formed by mixing an elastomeric polymer solution (for example, an elastomeric polymer dissolve in a solvent such as xylene) with a crosslinker amine and heating the mixture to form a crosslinked gel. As used herein, the term "xylene" may encompass any one of or combination of xylene isomers (that is ortho-xylene, meta-xylene, and para-xylene). In some embodiments, the elastomeric polymer and crosslinked gel may be prepared as according to the procedure described in U.S. Publication No. 2017/0073555 titled "Pendant Epoxide Polymers and Methods of Treating Subterranean Formations," a copy of which is hereby incorporated by reference for the purposes of United States patent practice. The gel may be extruded through a die having orifices with selected dimensions into a non-solvent that is miscible with the solvent used in the elastomeric polymer solution. The extruded gel strands may be allowed to desolvate in the presence of the non-solvent, and the non-solvent and remaining solvent may be removed by filtration or decantation. The gel strands may then be dried and cut into gel pieces to form the gel LCM. The resulting gel LCM composition may swell by absorbing about 10 to about 17 times its weight when introduced to a lost circulation zone in the presence of a non-aqueous fluid such as a drilling mud or component of a drilling mud.

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

Example oil-swellable polymer gel compositions were prepared and tested according to the techniques described herein. The example oil-swellable polymer gel composition was prepared from a commercially available ethylene/methyl acrylate/glycidyl methacrylate terpolymer with the monomers having weight percentages of about 64:24:8 respectively. The procedure for the preparation and testing of example oil-swellable polymer gel compositions is described below:

1) Prepare a solution of elastomeric polymer having an olefinic monomer and a polar monomer functionalized with reactive groups in a suitable solvent such as an aromatic solvent (e.g., xylene) or an aliphatic solvent (e.g., diesel) by stirring at room temperature for 24 hours or at 140° F. for about 8 hours;
2) Add a crosslinker capable of reacting with the reactive groups on the polymer and crosslink the polymer by heating to 225° F. until it forms a crosslinked gel;
3) Extrude the gel through a die containing orifices of selected dimensions into a non-solvent that is miscible with solvent in the gel;
4) Allow the extruded gel strands to desolvate in the presence of non-solvent for at least 24 hours;
5) Remove solvent mixture by filtration or decantation;
6) Dry the gel strands and chop to desired sizes;
7) Add a known weight of dried chopped gel strand to a selected organic fluid, such as a base oil used in drilling fluids;
8) Store the resulting mixture at a temperature for a time period;
9) Decant or filter the solvent from the mixture; and
10) Measure the weight of the swollen gel strand.

The ethylene/methyl acrylate/glycidyl methacrylate terpolymer was dissolved in a solvent to make a solution of 6% by weight terpolymer. The ethylene/methyl acrylate/glycidyl methacrylate terpolymer in solution was crosslinked with a crosslinker amine (that is, a crosslinker that reacts with the epoxy groups of the terpolymer). The weight ratio of terpolymer to crosslinker to cure accelerator was 6:1:0.2.

Three oil-swellable polymer gel compositions were prepared using two different solvents to dissolve the terpolymer and two different crosslinker amines: Gel I was prepared with a xylene solvent and tetraethylene pentaamine (TEPA) with a cure accelerator; Gel II was prepared with a diesel solvent and tetraethylene pentaamine (TEPA) without a cure accelerator; and Gel III was prepared with a diesel solvent and polyoxypropylene triamine (POPTA) The cure accelerator was Accelerator 399 available from Huntsman Corporation of The Woodlands, Tex., USA.

Ten grams of each example oil-swellable polymer gel composition was extruded through a circular metallic die having a diameter of 4.2 centimeters (cm) and having 17 holes of 2.78 millimeters (mm) diameter. The metal disc of the die was affixed to one end of a metal cylinder with a threaded lid, and the other end of the metal disc was provided with a hand-held piston that fit snugly in the cylinder. Pressure was applied to the gel by squeezing the handle of the piston by hand. Strands of Gel I were extruded into 100 ml acetone. Stands of Gel II and Gel III were extruded into 100 ml of isopropyl alcohol. The extruded stands were allowed to stand overnight at room temperature. The solutions having the extruded strands were then filtered and air dried. The weights of the recovered dry gels were 0.9 g for Gel I, 0.98 g for Gel II, and 0.95 g for Gel III.

The absorbency of the dried gels was tested using xylene. About 0.32 g of each example dried gel was mixed with 10 ml of xylene and heated at about 180° F. for about an hour. The unabsorbed xylene was poured out and the weight of each example swollen gel was measured. A swell index for each example gel was calculated by subtracting the dry weight (that is, the weight of dry crosslinked polymer recovered from the swollen product) from the wet weight and dividing by the dry weight. The percent increase in weight due to swelling was calculated by dividing the wet weight of each gel by the dry weight.

Table 1 shows the dry weight, wet weight, swelling index, and percent increase in weight due to swelling (% Swelling) for the example compositions Gel I, Gel II, and Gel III:

TABLE 1

| | RESULTING PROPERTIES FOR EXPERIMENTAL GEL COMPOSITIONS | | | |
|---|---|---|---|---|
| Gel # | Dry weight (g) | Wet wt (g) | Swelling Index | % Swelling |
| I | 0.32 | 5.7 | 16.8 | 1825 |
| II | 0.32 | 3.4 | 9.6 | 1063 |
| III | 0.32 | 3.8 | 10.9 | 1175 |

As shown in Table 1, each of the desolvated particulate crosslinked gels absorbed several times its weight by swelling and increasing in volume. Accordingly, the placement of such gels in a lost circulation zone where a non-aqueous fluid is experiencing fluid loss may allow the non-aqueous fluid to swell the gels and block the lost circulation zone. The use of such compositions with a non-swelling solvent to place in the loss circulation zone may thus reduce or eliminate the loss of fluids in the zone. For example, such non-swelling solvents may include alcohols, acetone and other ketones (e.g., methyl ethyl ketones and cyclohexanone), and alcohol ethers (e.g., monobutyl ethylene glycol).

As shown in Table 1, the degree of swelling may be controlled by varying the crosslink density of the gel, the type of crosslinker, and the crosslinking duration. As indicated by the experimental results, lightly crosslinked gels may have a higher swelling capacity and a higher swollen volume, whereas more substantially crosslinked gels may have a lower swelling capacity and lower swollen volume.

Compositions and Processes for Forming an Oil-Swellable LCM

In some embodiments, an oil-swellable gel LCM may include gel pieces formed from a composition of an elastomeric polymer and a crosslinker amine processed in the manner described below and illustrated in the FIGURE. In some embodiments, the elastomeric polymer is a copolymer having an olefinically unsaturated hydrocarbon monomer and a monomer having an epoxy pendant group. In some embodiments, the monomer having an epoxy pendant group may be a glycidyl acrylate monomer (for example, glycidyl methacrylate). In some embodiments, the molar ratio of unsaturated hydrocarbon monomer to epoxy containing monomer is in the range of about 75:25 to about 99:1. In some embodiments the elastomeric polymer includes an additional polar monomer. In some embodiments, the molar ratio of the sum of olefinically unsaturated hydrocarbon monomer and the polar monomer to epoxy containing monomer is in the range of about 75:25 to about 99:1. Examples of suitable polar monomers include olefinically unsaturated esters. In some embodiments, suitable olefinically unsaturated esters include methyl acrylate, methyl methacrylate, ethyl acrylate, ethyl methacrylate, butyl acrylate, and butyl methacrylate. In some embodiments, the elastomeric polymer may be ethylene/methyl acrylate/glycidyl methacrylate terpolymer. In some embodiments, the ethylene/methyl acrylate/glycidyl methacrylate terpolymer has monomer weight percentages of about 64:24:8 respectively. In some embodiments, the composition includes a cure accelerator suitable for amines.

In some embodiments, the crosslinker amine may include at least one of: tetraethylene pentaamine (TEPA), triethylene glycol diamine (TEGDA), polyoxypropylene triamine (POPTA), and diethyltoluenediamine (DETDA). In other embodiments, other suitable crosslinker amines may be used. In some embodiments, the weight ratio of elastomeric polymer to amine crosslinker is 10:1 to 4:1.

In some embodiments, the cure accelerator is an accelerator having both hydroxyl groups and reactive amine groups. In some embodiments, the cure accelerator may be Accelerator 399 available from Huntsman Corporation of The Woodlands, Tex., USA. In some embodiments, the ratio of crosslinker amine to cure accelerator is in the range of 100:1 to 5:1

In some embodiments, the resulting LCM formed from the elastomeric polymer and the crosslinker amine may absorb about 10 to about 17 times its weight when introduced to a loss circulation zone in the presence of a non-aqueous fluid, such as a synthetic-based mud (SBM) or an oil-based mud (OBM). In some embodiments, the pieces of the oil-swellable LCM may have a diameter in the range of about 1 mm to about 5 mm. In some embodiments, the pieces of the oil-swellable LCM may have a diameter of about 2.78 mm. In some embodiments, the pieces of the oil-swellable LCM may have a length in the range of 1 mm to about 5 mm.

The FIGURE depicts a process 100 for forming an LCM from an elastomeric polymer and crosslinker amine in accordance with an embodiment of the disclosure. An elastomeric polymer may be dissolved in a solvent to form a solution (block 102). For example, in some embodiments the elastomeric polymer may include an ethylene/methyl acrylate/glycidyl methacrylate terpolymer. In some embodiments, the solvent may include xylene. A crosslinker amine capable of reacting with the reactive groups on the polymer may be added to the elastomeric polymer solution, and the polymer-crosslinker mixture may be heated to form a gel (block 104). In some embodiments, the crosslinker amine may include at least one of: tetraethylene pentaamine (TEPA), triethylene glycol diamine (TEGDA), polyoxypropylene triamine (POPTA), and diethyltoluenediamine (DETDA).

The gel may be extruded through a die having orifices with selected dimensions into a non-solvent that is miscible with the solvent in the gel (block 106). In some embodiments, each orifice may have a diameter of at least 1 mm, at least 2 mm, at least 3 mm, at least 4 mm, or greater than 4 mm. In some embodiments, the non-solvent may include acetone. In other embodiments, the non-solvent may be another ketone. In some embodiments, the non-solvent may be isopropyl alcohol. The extruded gel strands may be allowed to desolvate in the presence of the non-solvent (block 108). For example, in some embodiments the extruded gel strands may desolvate at room temperature for a time period of at least 8 hours. The liquid may be removed from the gel strands mixture by filtration or decantation of the gel strands (block 110). The gel strands may then be dried (for example, air dried) and cut or otherwise processed to form an LCM from the gel pieces having a selected size (block 112).

In some embodiments, the shape and size (for example, diameter and length) of the gel pieces may be selected based on the dimensions of the lost circulation zone. The shape and size of the gel pieces may be selected by using die orifices having different shapes and sizes and by chopping the gel pieces to the selected size. For example, the diameter of the orifice of a die may be selected to achieve a desired diameter of the gel pieces.

In some embodiments, the swelling capabilities of the LCM gel pieces may be modified by modifying the crosslink density of the gel, such as by selecting a specific crosslinker amine, an elastomer to crosslinker ratio, and crosslinking duration. For example, as discussed above, a TEPA crosslinker (used in example Gel I and Gel II discussed above) may result in greater crosslinking of the elastomeric polymer after a relatively shorter duration. In another example, a POPTA crosslinker (used in example Gel III) may result relatively less crosslinking of the elastomeric polymer after a longer duration, as compared to TEPA. Moreover, the addition of a suitable accelerator in the preparation of the LCM gel pieces may further result in greater crosslinking after a relatively shorter duration, as compared to gel pieces prepared without an accelerator.

In some embodiments, gel pieces of the oil-swellable LCM may be prepared at the surface of a well site having a well accessing a lost circulation zone in a formation. As will be appreciated, the elastomeric polymer may be crosslinked and desolvated prior to placement in the lost circulation zone. The oil-swellable LCM may be added to a non-swellable solvent and introduced (e.g., by pumping) downhole to positing the oil-swellable LCM into contact with the lost circulation zone. As used herein the term "non-swellable solvent" refers to a solvent that does not swell the gel LCM in the manner described above (for example, a swelling index of 1). In some embodiments, the non-swellable solvent may include alcohols, acetone and other ketones (e.g., methyl ethyl ketones and cyclohexanone), and alcohol ethers (e.g., monobutyl ethylene glycol). Upon contact with a non-aqueous fluid, such as a drilling fluid or one or more components of a drilling fluid, the oil-swellable LCM may swell in-situ and alter the lost circulation zone (for example, by entering and blocking porous and permeable paths, cracks, and fractures in a formation in the lost circulation zone, such as forming a structure in a mouth or within a fracture). In some embodiments, the LCM may be added to the drilling fluid. In such embodiments, the drilling fluid may have an aqueous fluid or a non-aqueous fluid as the continuous phase.

In some embodiments, the oil-swellable LCM may be allowed to interact with the lost circulation zone and a non-aqueous fluid for a contact period. For example, the contact period may be of sufficient duration to enable formation of a swollen gel pieces as a result of the interaction between the oil-swellable LCM and the non-aqueous fluid. As will be appreciated, due to the crosslinking the oil-swellable LCM may be insolubilized in any liquid that otherwise dissolves the elastomeric polymer.

In other embodiments, the gel pieces described herein may be used in well cementing operations. In such embodiments, the gel pieces described herein may be added to cement formulations as self-sealing additives. In such embodiments, the gel pieces self-sealing additives may swell when contacted by a flow of suitable oils, such as produced crude oil, condensates, or manually injected oils, so that the swollen gel pieces can block, seal, or both any cracks formed due to failures of the cement sheath. In some embodiments, the gel pieces may be used as additive to a cement to form an altered cement formulation. The altered cement formulation may be introduced into an annular space in a wellbore and allowed to set, such that the cement forms a sealant in the annular space. In some embodiments, if undesirable fluids such as gas, water or oil are suspected of traversing through the cement column in the annular space due to the presence of cracks, channels and voids that developed during the life of the well, a liquid having the gel pieces may be injected to seal the flow paths thereby blocking the undesirable fluids from entering the annular space from the formation.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described herein. It is to be understood that the forms shown and described herein are to be taken as examples of embodiments. Elements and materials may be substituted for those illustrated and described herein, parts and processes may be reversed or omitted, and certain features may be utilized independently, all as would be apparent to one skilled in the art after having the benefit of this description. Changes may be made in the elements described herein without departing from the spirit and scope of the disclosure as described in the following claims. Headings used herein are for organizational purposes only and are not meant to be used to limit the scope of the description.

What is claimed is:

1. A method of forming a lost circulation material (LCM), comprising:
   preparing an elastomeric polymer solution comprising an elastomeric polymer and a solvent, the elastomeric polymer including a first monomer comprising an olefinically unsaturated hydrocarbon monomer and a second monomer comprising an epoxy pendant group;
   mixing the elastomeric polymer solution with a crosslinker to form a gel, the crosslinker comprising an amine;
   extruding the gel through an orifice having a diameter and into a non-solvent to form a gel strand, the non-solvent miscible with the solvent; and
   cutting the desolvated gel strand into a plurality of particulate gel pieces to form the LCM.

2. The method of claim 1, comprising removing the non-solvent and remaining solvent from the gel strand.

3. The method of claim 2, wherein removing the non-solvent and remaining solvent from the gel strand comprises performing at least one of:
   filtering the non-solvent and remaining solvent from the gel strand; and
   decanting the non-solvent and remaining solvent from the gel strand.

4. The method of claim 1, wherein the second monomer comprises a glycidyl acrylate.

5. The method of claim 4, wherein the elastomeric polymer comprises ethylene/methyl acrylate/glycidyl methacrylate terpolymer.

6. The method of claim 1, wherein the amine comprises a polyamine comprising at least two primary amine groups.

7. The method of claim 6, wherein the amine comprises at least one of: tetraethylene pentaamine (TEPA), triethylene glycol diamine (TEGDA), polyoxypropylene triamine (POPTA), and diethyltoluenediamine (DETDA).

8. The method of claim 1, wherein the solvent comprises xylene.

9. The method of claim 1, wherein the non-solvent comprises acetone.

10. The method of claim 1, wherein the diameter is in the range of 1 millimeter (mm) to 5 mm.

11. The method of claim 1, comprising mixing a cure accelerator with the elastomeric polymer solution and crosslinker.

12. The method of claim 1, wherein the cure accelerator comprises an alkanolamine.

13. The method of claim 1, comprising air drying the gel strand before cutting the gel strand into a plurality of gel pieces to form the LCM.

14. A lost circulation material (LCM) composition, comprising:
   a plurality of gel pieces comprising an elastomeric polymer crosslinked using a crosslinker, the crosslinker consisting of an amine, wherein the elastomeric polymer includes a first monomer comprising an olefinically unsaturated hydrocarbon monomer and a second monomer comprising an epoxy pendant group;
   wherein the plurality of gel pieces are formed by extruding a gel through an orifice having a diameter and into a non-solvent to form a gel strand and cutting the gel strand into the plurality of gel pieces to form the LCM.

15. The composition of claim 14, wherein the second monomer comprises a glycidyl acrylate.

16. The composition of claim 14, wherein the elastomeric polymer comprises ethylene/methyl acrylate/glycidyl methacrylate terpolymer.

17. The composition of claim 14, wherein the amine comprises a polyamine comprising at least two primary amine groups.

18. The composition of claim 17, wherein the amine comprises at least one of tetraethylene pentaamine (TEPA), triethylene glycol diamine (TEGDA), polyoxypropylene triamine (POPTA), and diethyltoluenediamine (DETDA).

19. The composition of claim 14, wherein the diameter of each of the plurality of gel pieces is in the range of 1 millimeter (mm) to 5 mm.

20. The composition of claim 14, wherein the length of each of the plurality of gel pieces is in the range of 2 millimeter (mm) to 15 mm.

\* \* \* \* \*